C. Alvord,
Brick Mold.
N°11,959.    Patented Nov. 21, 1854.
Fig. 1
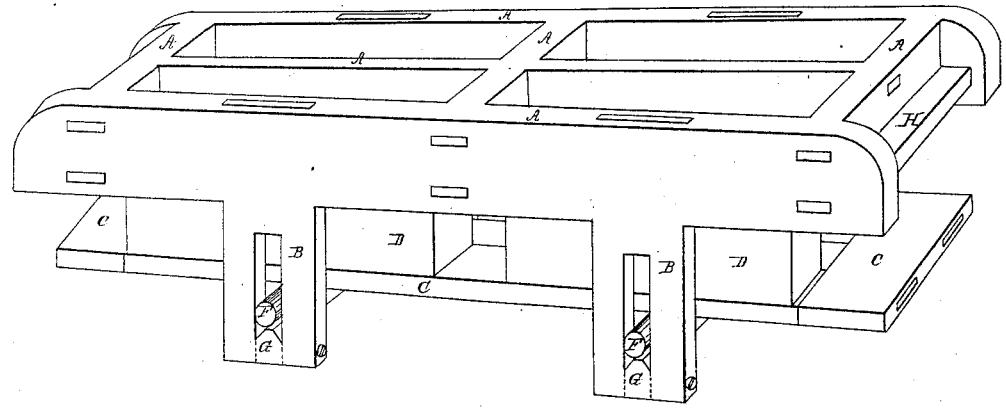
Fig. 2
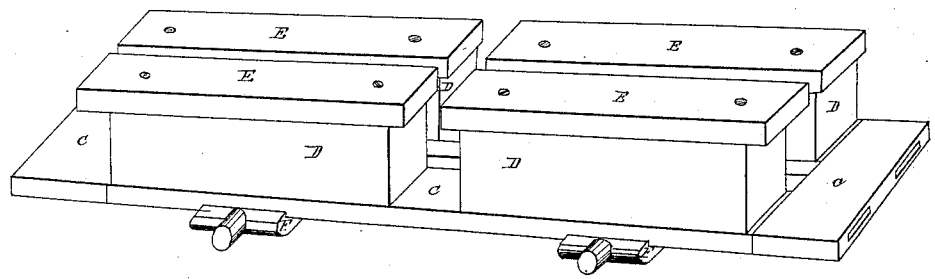
Fig. 3
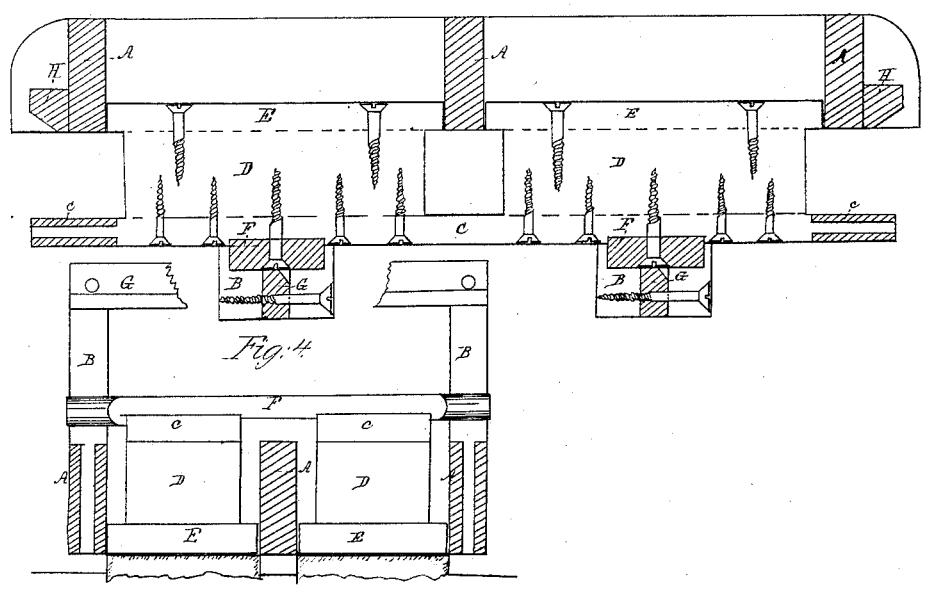
Fig. 4

UNITED STATES PATENT OFFICE.

CLARK ALVORD, OF SYRACUSE, NEW YORK.

HAND BRICK-MOLD.

Specification of Letters Patent No. 11,959, dated November 21, 1854.

*To all whom it may concern:*

Be it known that I, CLARK ALVORD, of Syracuse, Onondaga county, and State of New York, have invented a new and useful Machine, which I call a "Compound Brick-Mold," of which the following is a full and exact description of its construction and operation, reference being had to the annexed drawings, making a part of this specification, in which—

Figure 1 is a view of the mold as combined and in position to receive the clay; Fig. 2, a sectional view showing the back boards and followers uncombined with the mold; Fig. 3, a side view with the side of the mold removed showing the construction and position of said followers in the mold when filled, and Fig. 4 an end view with the end of the mold removed showing the relative position of the followers and mold, their relation to the bricks after said mold is drawn from said bricks upon the yard and not lifted from them.

In said drawings like letters refer to like parts.

In constructing said compound mold I build a mold of the kind in use except that it is half an inch deeper and without back boards. Into mortises formed in the sides of said mold and opposite the center of each brick I insert legs about five inches long, of the thickness of the side pieces of the mold, three inches broad with a slot one half inch wide in their centers and extending from the bottoms to near the shoulders as shown at B, B, Fig. 1. A in said Fig. 1 indicates the mold. These legs serve as guides to the movable back-board as shown at F, F, Fig. 1. I next get out two sticks in width equal to the width of said legs and from one half to three fourths of an inch thick, and of sufficient length to reach across said mold from outside to outside. Upon the ends of these pieces I form pins in length equal to the thickness of said legs and one half inch in diameter, so that the length of said sticks from shoulder to shoulder shall be equal to the distance between said legs from inside to inside. Said shoulders are rounded as shown at F, F, Fig. 2, said pieces being placed in position across said mold with the pins or rounded ends inserted in the slots in said legs or guides. I get out two boards of the length of the mold, one inch thick and in width one third less than the bricks to be molded. These I place lengthwise of the mold and directly over the center of the recesses or openings in which the bricks are to be formed and across said guide pieces to which they are fastened by letting on, and by screws, as shown at F, F, Fig. 3. These back-boards are also fastened together at the ends by a strip about two inches wide, one thick, with mortises fitting upon tenons formed upon the ends of said boards as shown at C, C, Figs. 1 and 3. For followers I use blocks of the thickness of the brick, to be molded, in width one third less than the width of such brick and in length one eighth less than the length of such brick. These I fasten to said back-board (they having been turned over and replaced upon the mold) by screws, and at such points upon the boards that they will occupy a central position in the recesses of said mold as shown at D, D, Fig. 3. I next fit to each recess in said mold a board one half inch thick and of a size to fill the same yet move easily. These I drop one into each recess upon the top of said blocks D, D, to which they are fastened by screws as shown at E Fig. 3. On the ends of said molds I fasten cleats extending out as far as the ends of said back-board, and beveled on the upper side as shown at H, Figs. 1 and 3. I next fasten said legs together by strips made sharp or rounded on the upper side and extending across said mold from leg to leg and inserted in the lower ends of said slots, filling the same to a point determining the distance said followers are to move in said mold. Said strips are then fastened by screws passing through the legs and end of the strips as shown at B and C, Fig. 3. These pieces support the back-boards and followers while the bricks are being pressed in as shown at C, C, Figs. 1 and 3.

To use said mold it is first wet, then sanded upon the faces of the followers only; it is then set upon its legs upon the table, when the back board falls down resting upon the cross pieces as above set forth, thus locating said followers at the bottom of the mold their faces the thickness of the brick to be molded from the top of said mold. The clay being pressed in either by hand or machinery it is carried and turned over upon the yard in the usual manner. The carrier then grasps the mold at each end his fingers under said cleats and his hands resting upon the ends of the back board near the center, when by an effort to close his hands the mold is drawn from the bricks, leaving them with the followers resting upon them as shown at E, E, Fig. 4. The mold is then picked up leaving the bricks upon the yard quite square, the edges being water struck and the top sand struck.

I am aware that discharging pistons are used in the molds of brick-machines of various kinds, when the pistons are thrust up by mechanical means, and therefore I do not claim this device: but What I do claim as my invention, and desire to secure by Letters Patent, is—

The application of the discharging piston to the hand-mold substantially in the manner and as above set forth and described.

In witness whereof I have hereunto set my signature this twentieth day of September eighteen hundred and fifty four.

CLARK ALVORD.

Witnesses:
 E. B. ALVORD,
 T. E. ALVORD.